United States Patent
Ishikawa et al.

(10) Patent No.: US 11,670,993 B2
(45) Date of Patent: Jun. 6, 2023

(54) MOTOR UNIT

(71) Applicant: NIDEC CORPORATION, Kyoto (JP)

(72) Inventors: Yuki Ishikawa, Kyoto (JP); Yohei Miyata, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 368 days.

(21) Appl. No.: 17/042,376

(22) PCT Filed: Mar. 27, 2019

(86) PCT No.: PCT/JP2019/013064
§ 371 (c)(1),
(2) Date: Sep. 28, 2020

(87) PCT Pub. No.: WO2019/208069
PCT Pub. Date: Oct. 31, 2019

(65) Prior Publication Data
US 2021/0044181 A1 Feb. 11, 2021

(30) Foreign Application Priority Data
Apr. 25, 2018 (JP) .............................. JP2018-084484

(51) Int. Cl.
*H02K 5/22* (2006.01)
*H02K 11/33* (2016.01)

(52) U.S. Cl.
CPC ............. *H02K 11/33* (2016.01); *H02K 5/225* (2013.01)

(58) Field of Classification Search
CPC ............ H02K 5/04; H02K 5/22; H02K 5/225; H02K 11/30; H02K 11/33
See application file for complete search history.

(56) References Cited

U.S. PATENT DOCUMENTS

| | | | |
|---|---|---|---|
| 2003/0200761 A1 | 10/2003 | Funahashi et al. | |
| 2009/0120712 A1* | 5/2009 | Kashimoto | B62D 5/0406 180/444 |
| 2017/0015199 A1* | 1/2017 | Shiba | B60K 6/40 |

FOREIGN PATENT DOCUMENTS

| | | |
|---|---|---|
| JP | 2004162618 A | 6/2004 |
| JP | 201110383 A | 1/2011 |
| JP | 201760225 A | 3/2017 |
| JP | 2017100611 A | 6/2017 |

OTHER PUBLICATIONS

International Search Report in PCT/JP2019/013064, dated Jun. 18, 2019. 2pp.

* cited by examiner

*Primary Examiner* — Eric Johnson
(74) *Attorney, Agent, or Firm* — Hauptman Ham, LLP

(57) ABSTRACT

A motor unit includes a motor having a motor shaft extending along a first direction, an inverter that supplies electric power to the motor, a housing that supports the motor therein, an inverter case that is fixed to one side of the housing in a second direction orthogonal to the first direction and that houses the inverter, and a plurality of bolts that fasten the housing and the inverter case. The plurality of bolts include a first bolt extending along the first direction, a second bolt extending along the second direction, a third bolt extending along a third direction orthogonal to both the first direction and the second direction, and one or more fourth bolts extending in a fourth direction intersecting all of the first direction, the second direction and the third direction.

9 Claims, 6 Drawing Sheets

MOTOR UNIT

CROSS-REFERENCE TO RELATED APPLICATIONS

This is the U.S. national stage of application No. PCT/JP2019/013064, filed on Mar. 27, 2019. This application also claims priority under 35 U.S.C. § 119(a) and 35 U.S.C. § 365(b) from Japanese Application No. 2018-084484, filed on Apr. 25, 2018, the entire content of which is incorporated herein by reference.

FIELD OF THE INVENTION

The present invention relates to a motor unit.

BACKGROUND

A motor drive unit in which an inverter case is fixed to a housing is known. For example, there is a motor drive unit in which an inverter case and a housing are fixed by fastening pins.

In the motor drive unit as described above, since the inverter case is disposed vertically above the housing, there is a problem that the motor drive unit is large in the vertical direction. On the other hand, it is conceivable that the inverter case is fixed to one side of the housing in the horizontal direction orthogonal to the vertical direction. However, in this case, since the inverter case is supported by the housing substantially in the form of a cantilever, a large amount of force is easily applied to the connecting portion between the inverter case and the housing. Therefore, it is necessary to firmly fix the inverter case and the housing.

SUMMARY

A motor unit according to an aspect of the present invention includes a motor having a motor shaft extending along a first direction, an inverter that supplies electric power to the motor, a housing that supports the motor therein, an inverter case that is fixed to one side of the housing in a second direction orthogonal to the first direction and that houses the inverter, and a plurality of bolts that fasten the housing and the inverter case. The plurality of bolts include a first bolt extending along the first direction, a second bolt extending along the second direction, a third bolt extending along a third direction orthogonal to both the first direction and the second direction, and one or more fourth bolts extending in a fourth direction intersecting all of the first direction, the second direction and the third direction.

The above and other elements, features, steps, characteristics and advantages of the present disclosure will become more apparent from the following detailed description of the preferred embodiments with reference to the attached drawings.

DETAILED DESCRIPTION

Figure 1:
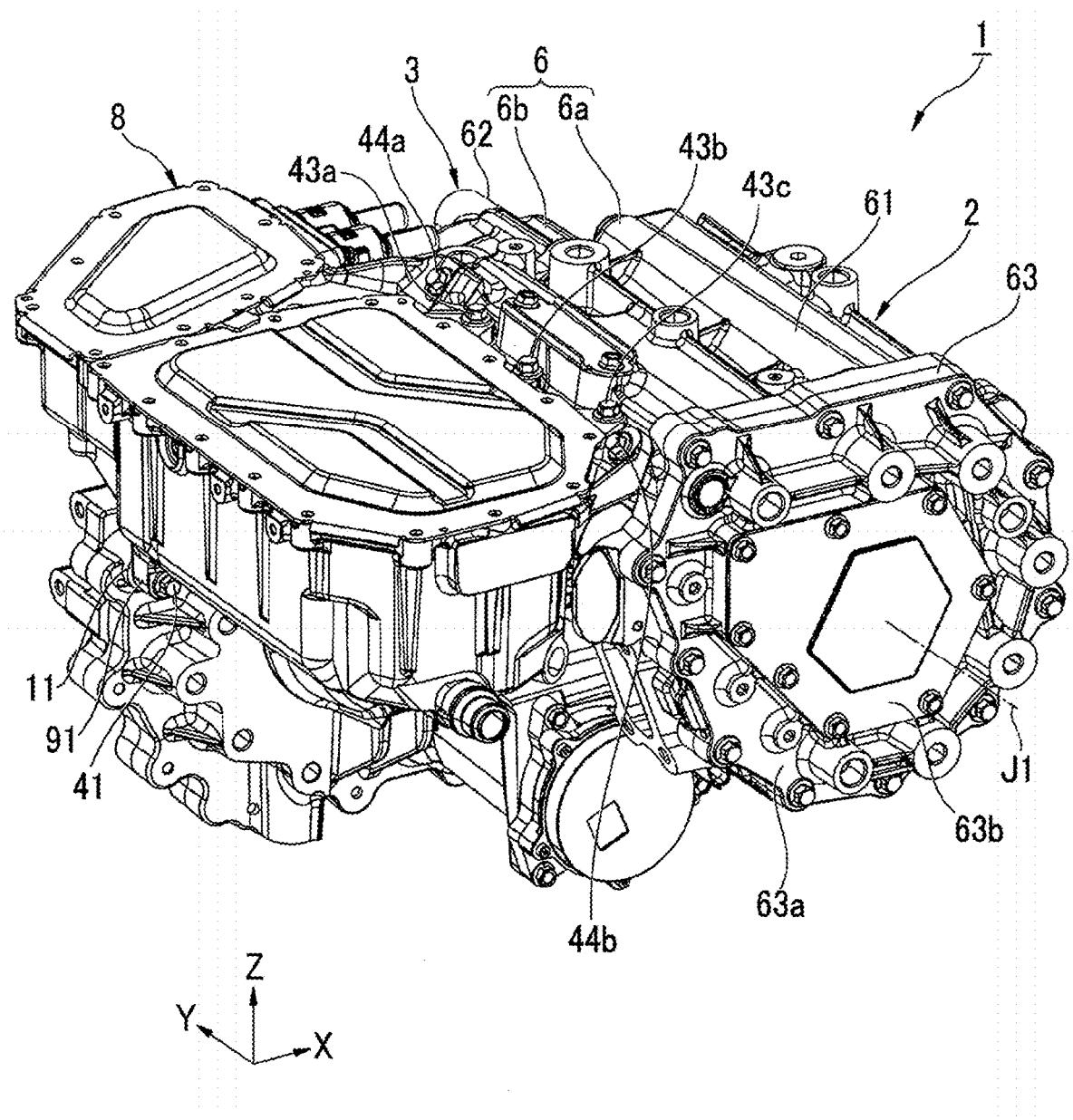
FIG. 1 is a perspective view of a motor unit of an preferred embodiment.

Hereinafter, the motor unit according to the preferred embodiment of the present invention will be described with reference to the drawings. Note that the scope of the present invention is not limited to the preferred embodiment described below, but includes any modification thereof within the scope of the technical idea of the present invention.

In the description below, the direction of gravity is defined and described based on the positional relationship when a motor unit 1 is mounted on a vehicle located on a horizontal road surface. In the drawings, an XYZ coordinate system is shown appropriately as a three-dimensional orthogonal coordinate system. In the XYZ coordinate system, the Z-axis direction indicates the vertical direction (that is, the up and down direction), the +Z direction is upward (opposite to the gravity direction), and the −Z direction is downward (gravitational direction). Further, the X-axis direction is a direction orthogonal to the Z-axis direction and indicates the front-rear direction of the vehicle in which the motor unit 1 is mounted, the +X direction is the front side of the vehicle, and the −X direction is the rear side of the vehicle. However, the +X direction may be the rear side of the vehicle and the −X direction may be the front side of the vehicle. The Y-axis direction is a direction orthogonal to both the X-axis direction and the Z-axis direction, indicates the width direction (left and right direction) of the vehicle. The +Y direction is the left side of the vehicle, and the −Y direction is the right side of the vehicle. However, when the +X direction is the rear side of the vehicle, the +Y direction may be the right side of the vehicle and the −Y direction may be the left side of the vehicle.

In the following description, unless otherwise specified, a direction (the Y-axis direction) parallel to a motor axis J1 of a motor 2 will be simply referred to as the term "axial direction", a radial direction centered on the motor axis J1 will be simply referred to as the term "radial direction", and a circumferential direction centered on the motor axis J1, i.e., a direction about the motor axis J1, will be simply referred to as the term "circumferential direction". However, the above-mentioned "parallel direction" also includes a substantially parallel direction. Further, the direction parallel to the X-axis direction is referred to as the "front-rear direction". The positive side of the X-axis direction is referred to as "front side", and the negative side of the X-axis direction is referred to as "rear side". The positive side of the Y-axis direction is referred to as "left side", and the negative side of the Y-axis direction is referred to as "right side".

In the present preferred embodiment, the axial direction, that is, the width direction of the vehicle corresponds to the first direction. The front-rear direction corresponds to the second direction. The vertical direction corresponds to the third direction. The left side corresponds to one side of the first direction, and the right side corresponds to the other side of the first direction. The rear side corresponds to one side of the second direction, and the front side corresponds to the other side of the second direction. The lower side corresponds to one side of the third direction, and the upper side corresponds to the other side of the third direction.

Figure 2:
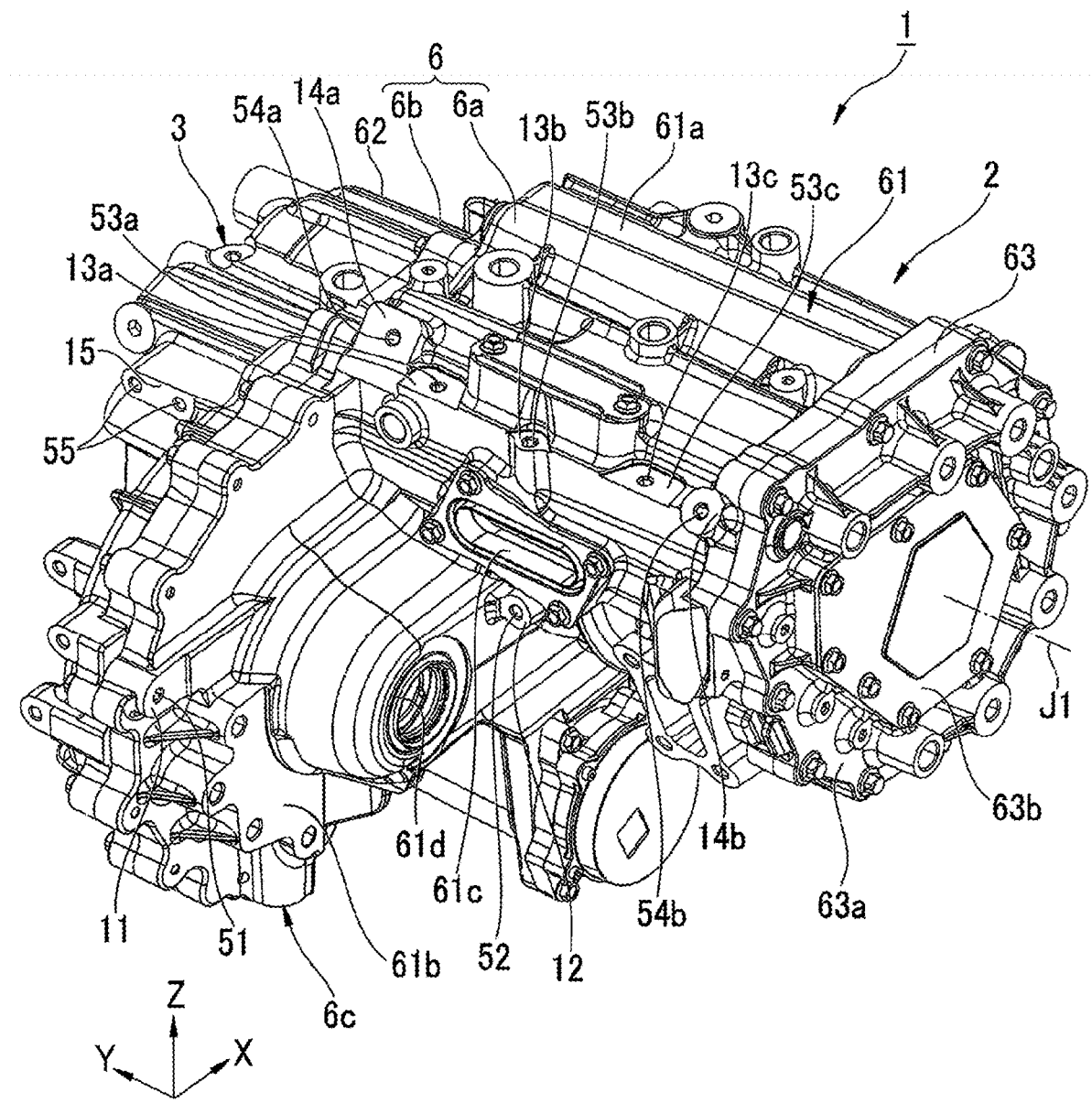
FIG. 2 is a perspective view showing a state in which the inverter unit is removed in the motor unit of the preferred embodiment.
Figure 3:
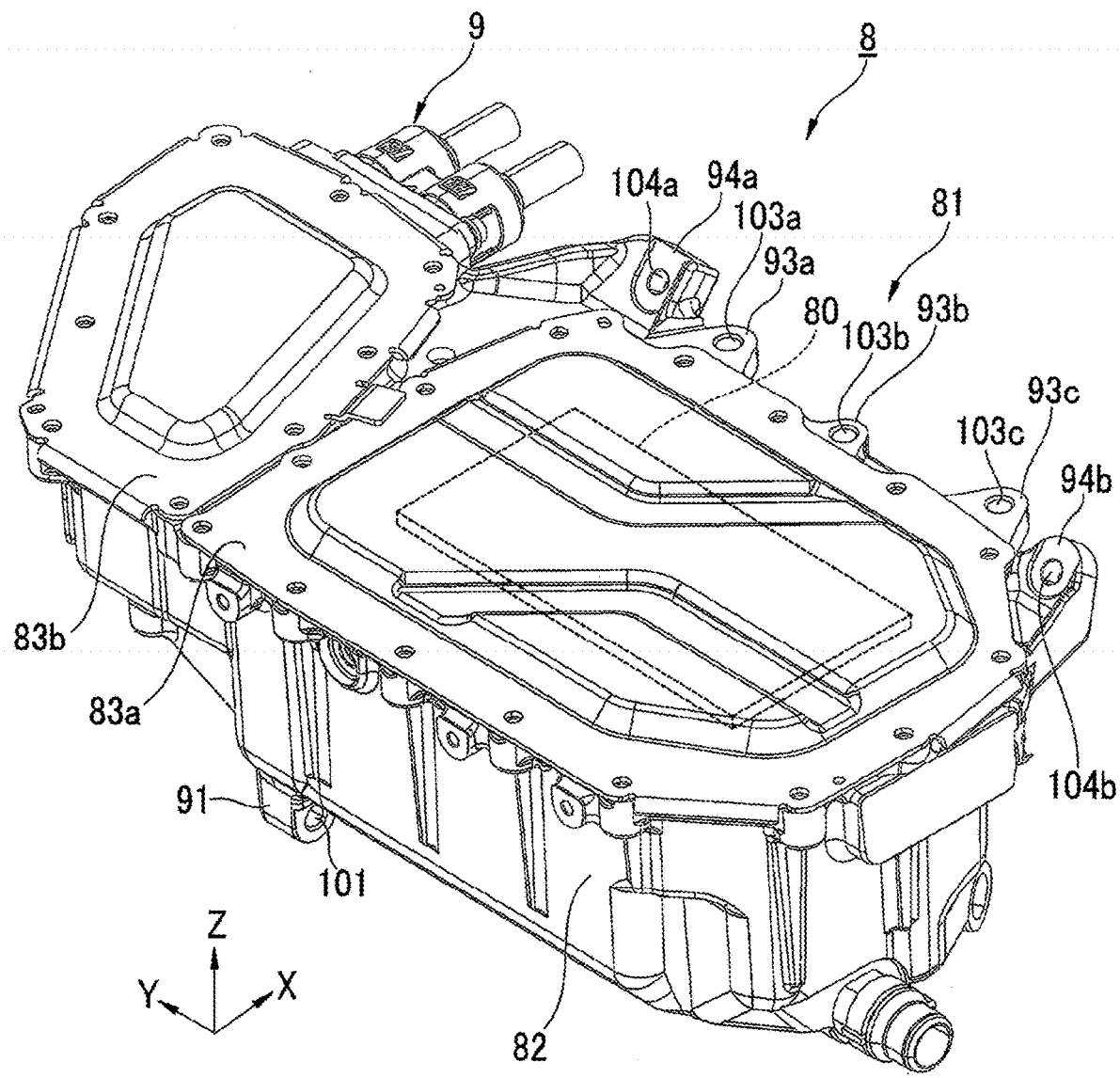
FIG. 3 is a perspective view of the inverter unit as viewed from the rear.
Figure 4:
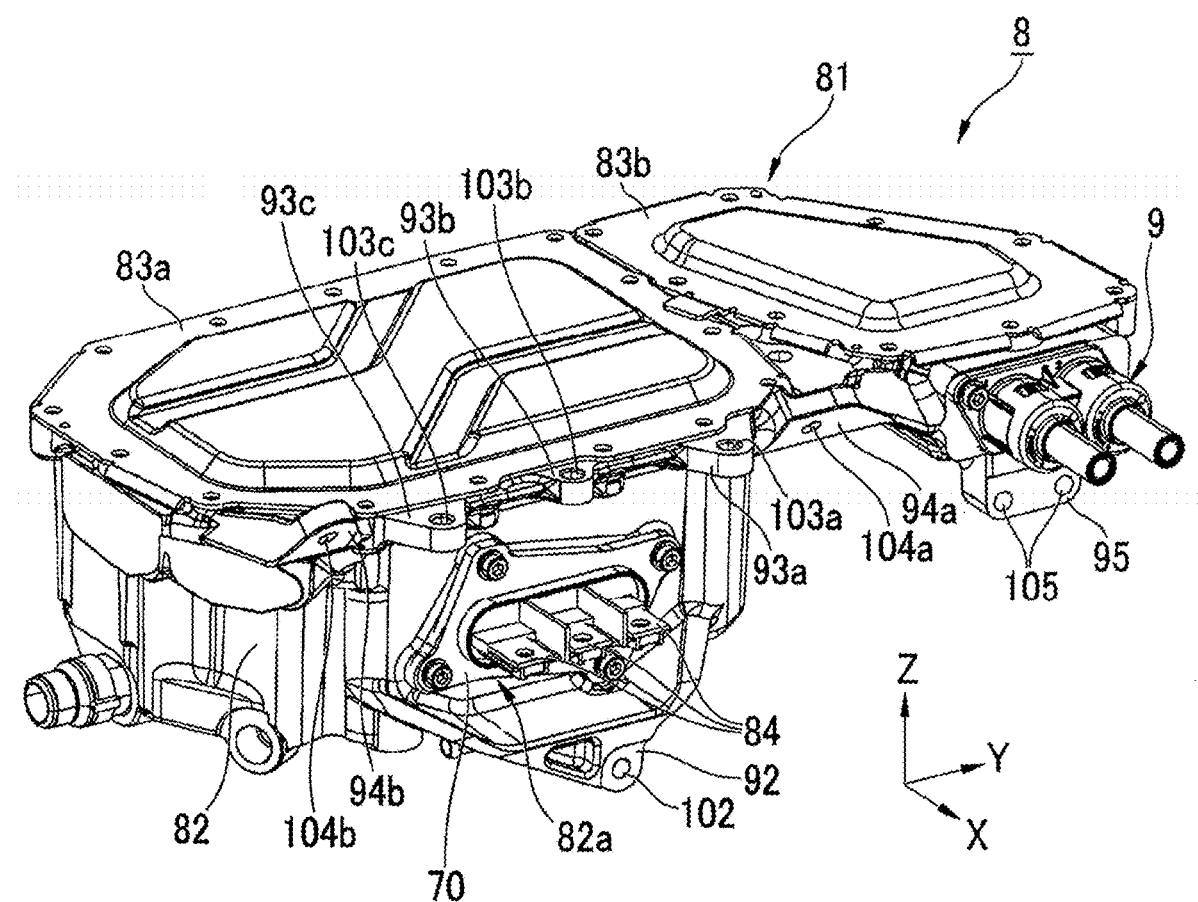
FIG. 4 is a perspective view of the inverter unit as viewed from the front.
Figure 5:
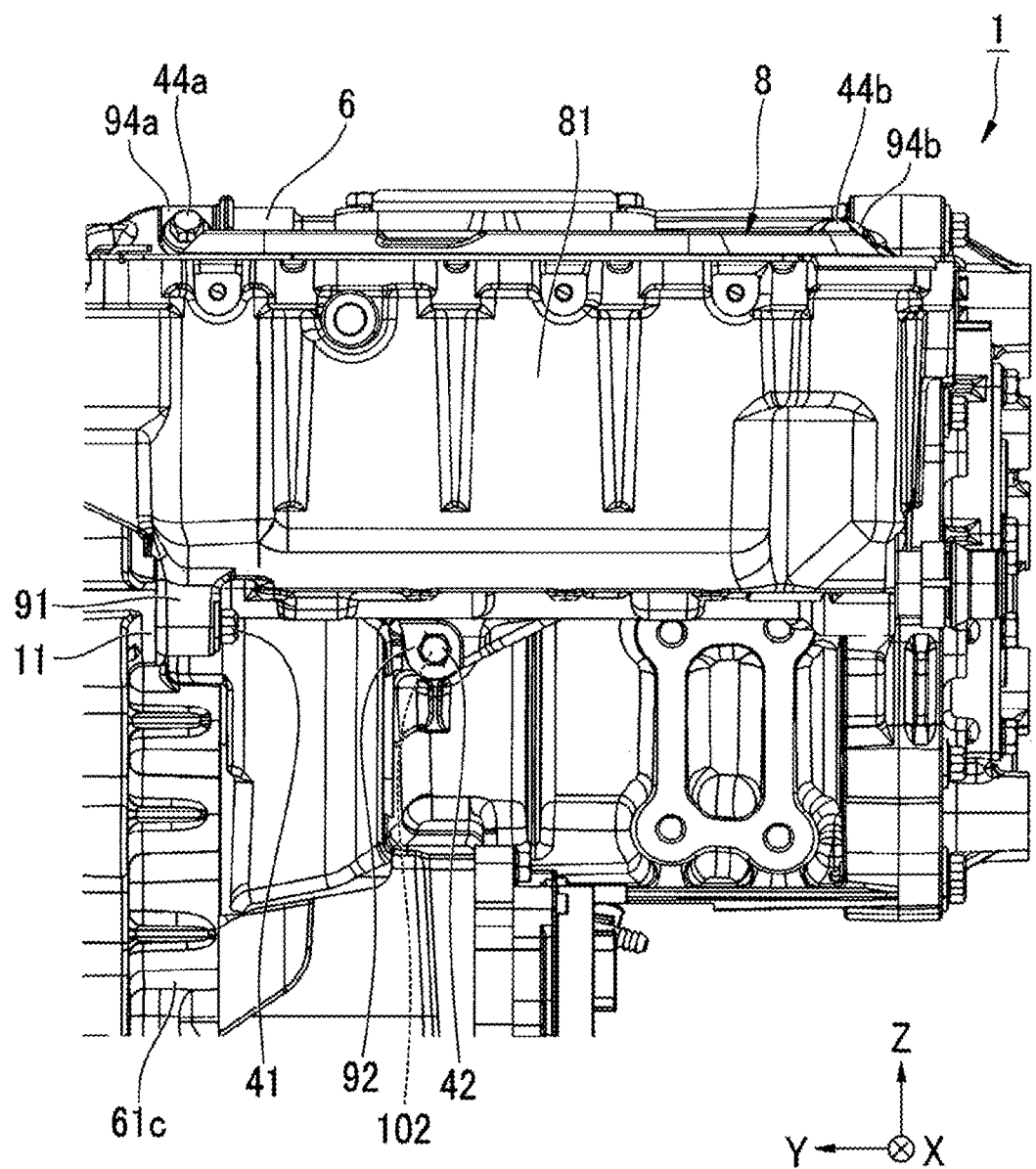
FIG. 5 is a partial side view of the motor unit of the preferred embodiment.
Figure 6:
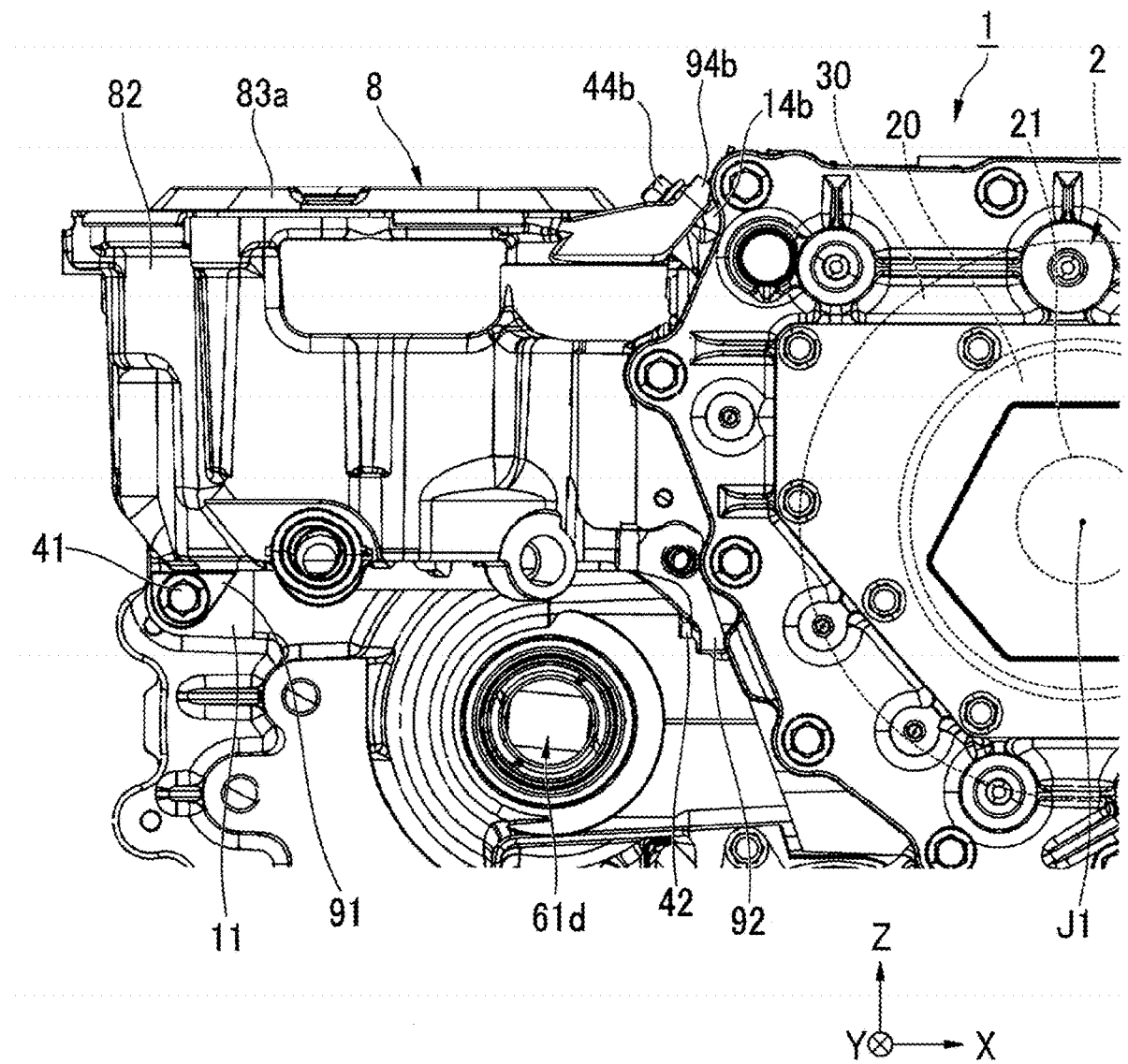
FIG. 6 is a partial front view of the motor unit of the preferred embodiment.

Hereinafter, the motor unit (electric drive device) 1 according to an exemplary preferred embodiment of the present invention will be described with reference to the drawings. FIG. 1 is a perspective view of the motor unit 1 of the preferred embodiment. FIG. 2 is a perspective view showing a state in which an inverter unit 8 is removed in the motor unit 1 of the preferred embodiment. FIG. 3 is a perspective view of the inverter unit 8 as viewed from the rear. FIG. 4 is a perspective view of the inverter unit 8 as viewed from the front. FIG. 5 is a partial side view of the motor unit 1 of the preferred embodiment. FIG. 6 is a partial front view of the motor unit 1 of the preferred embodiment.

The motor unit 1 is installed in a vehicle having a motor as a power source such as a hybrid vehicle (HEV), a plug-in hybrid vehicle (PHV), or an electric vehicle (EV), and is used as the power source thereof.

As shown in FIG. 1, the motor unit 1 includes the motor (main motor) 2 and a gear unit 3, a housing 6 that houses the motor 2 and the gear unit 3, and the inverter unit 8 fixed to the housing 6.

As shown in FIGS. 1 and 6, the motor 2 includes a rotor 20 that rotates around the motor axis J1 that extends in the horizontal direction, and a stator 30 located radially outside of the rotor 20. The housing 6 houses the motor 2 therein. That is, the housing 6 supports the motor 2 therein. In the present preferred embodiment, the gear unit 3 has a speed reducer and a differential device (not shown). A motor shaft 21 of the motor 2 is connected to the speed reducer. The differential device is connected to the speed reducer. The differential device transfers the torque output from the motor 2 through the speed reducer to wheels of the vehicle. The speed reducer and the differential device are housed in the housing 6.

As shown in FIG. 2, the housing 6 includes a first housing member 61, a second housing member 62 and a blockage unit 63. The second housing member 62 is located on the left side (+Y direction) of the first housing member 61. The blockage unit 63 is located on the right side (−Y direction) with respect to the first housing member 61. The housing 6 may be composed of three or more members.

The first housing member 61 includes a tubular circumferential wall portion 61a that houses the motor 2 therein, and a side plate portion 61b located on one side of the axial direction of the circumferential wall portion 61a. The first housing member 61 has a first opening hole 61c on the rear face of the circumferential wall portion 61a. That is, the housing 6 has the first opening hole 61c. The first opening hole 61c penetrates the rear wall portion of the circumferential wall portion 61a in the front-rear direction and opens rearward. The first opening hole 61c has an oval shape that is long in the axial direction when viewed from the rear.

The side plate portion 61b protrudes radially outward with respect to the circumferential wall portion 61a. The side plate portion 61b has a first axle passage hole 61d through which a drive shaft (not shown) that supports wheels passes. The first axle passage hole 61d penetrates the side plate portion 61b in the axial direction.

The blockage unit 63 is fixed to the circumferential wall portion 61a of the first housing member 61. The blockage unit 63 closes the opening of the tubular first housing member 61 on the right side. The blockage unit 63 includes a blockage unit main body 63a and a lid member 63b. The blockage unit main body 63a has a window portion that penetrates in the axial direction. The lid member 63b closes the window portion of the blockage unit main body 63a from the outside.

The second housing member 62 is fixed to the side plate portion 61b of the first housing member 61. The second housing member 62 has a concave shape that opens toward the side plate portion 61b side. The opening of the second housing member 62 is covered by the side plate portion 61b. The space between the second housing member 62 and the side plate portion 61b constitutes a gear chamber that houses the gear unit 3. That is, the second housing member 62 houses the speed reducer and the differential device. The second housing member 62 is provided with a second axle passage hole (not shown). The second axle passage hole overlaps the first axle passage hole 61d when viewed in the axial direction. The axle of the vehicle (not shown) passes through the second housing member 62 through the first axle passage hole 61d and the second axle passage hole.

The circumferential wall portion 61a and the blockage unit 63 of the first housing member 61 constitute a motor chamber that houses the motor 2. That is, the circumferential wall portion 61a and the blockage unit 63 constitute a motor housing unit 6a shown in FIG. 1. Similarly, the side plate portion 61b of the first housing member 61 and the second housing member 62 constitute a gear chamber that houses the gear unit 3. That is, the side plate portion 61b and the second housing member 62 constitute a gear housing unit 6b shown in FIG. 1. In this way, the housing 6 includes the motor housing unit 6a having a motor chamber therein that houses the motor 2, and the gear housing unit 6b having a gear chamber therein that houses the gear unit 3. The gear housing unit 6b includes an overhanging portion 6c that overhangs radially outward of the motor housing unit 6a when viewed in the axial direction. That is, the housing 6 includes the overhanging portion 6c that overhangs radially outward of the motor housing unit 6a.

As shown in FIG. 2, the housing 6 has a plurality of fastening portions to which bolts fixing the inverter unit 8 are tightened. Specifically, the housing 6 includes a first fastening portion 11, a second fastening portion 12, third fastening portions 13a, 13b, and 13c, fourth fastening portions 14a and 14b, and a fifth fastening portion 15.

The first fastening portion 11 is located at the rear end portion of the side plate portion 61b. The first fastening portion 11 has a screw hole 51 that opens to the right (−Y side) and extends in the axial direction. The face of the first fastening portion 11 that faces rightward is a flat face that spreads from the opening of the screw hole 51 in a direction orthogonal to the axial direction.

The second fastening portion 12 is located on the rear face of the circumferential wall portion 61a. The second fastening portion 12 is located below the first opening hole 61c. The second fastening portion 12 has a screw hole 52 that is open to the rear and extends in the front-rear direction. The face of the second fastening portion 12 that faces rearward is a flat face that spreads from the opening of the screw hole 52 in a direction orthogonal to the front-rear direction.

The third fastening portions 13a, 13b, and 13c are located at the rear upper end portion of the circumferential wall portion 61a. The third fastening portions 13a, 13b, and 13c are disposed in this order from the left to the right along the axial direction at equal or substantially equal intervals. The third fastening portion 13a has a screw hole 53a that opens upward and extends downward. The face of the third fastening portion 13a that faces upward is a flat face that spreads in the horizontal direction from the opening of the screw hole 53a. The third fastening portions 13b and 13c have the screw holes 53b and 53c, respectively, as in the third fastening portion 13a. The faces of the third fastening portions 13b and 13c that face upward are flat faces that spread horizontally from the openings of the screw holes 53b and 53c, respectively.

The fourth fastening portion 14a is located at the left rear end portion of the circumferential wall portion 61a. The fourth fastening portion 14a is disposed adjacent to the left side of the third fastening portion 13a. The fourth fastening portion 14a has a screw hole 54a that opens obliquely upward and rearward and extends obliquely downward and frontward. The face of the fourth fastening portion 14a that faces obliquely upward and rearward is a flat face that spreads from the opening of the screw hole 54a in a direction orthogonal to the direction in which the screw hole 54a extends.

The fourth fastening portion 14b is located at the right rear end portion of the circumferential wall portion 61a. The fourth fastening portion 14b is disposed adjacent to the right side of the third fastening portion 13c. The fourth fastening portion 14b has a screw hole 54b that opens obliquely upward and rearward and extends obliquely downward and frontward. The face of the fourth fastening portion 14b that faces obliquely upward and rearward is a flat face that spreads from the opening of the screw hole 54b in a direction orthogonal to the direction in which the screw hole 54b extends.

The fifth fastening portion 15 is located at the rear face of the second housing member 62. The fifth fastening portion 15 has two screw holes 55 that open rearward and extend in the front-rear direction. The face of the fifth fastening portion 15 that faces rearward is a flat face that spreads from the openings of the two screw holes 55 in a direction orthogonal to the front-rear direction.

The inverter unit 8 is electrically connected to the motor 2. The inverter unit 8 controls the current supplied to the motor 2. As shown in FIG. 1, the inverter unit 8 is fixed to the housing 6. More specifically, the inverter unit 8 is fixed to the outer peripheral face of the motor housing unit 6a that faces radially outward.

At least part of the inverter unit 8 overlaps the overhanging portion 6c of the gear housing unit 6b when viewed in the axial direction. According to the preferred embodiment, by disposing the inverter unit 8 so as to overlap the overhanging portion 6c when viewed from the axial direction, it is possible to prevent the projected area of the motor unit 1 in the axial direction from being increased by the inverter unit 8. As a result, the motor unit 1 can be downsized by suppressing an increase in the projected area of the motor unit 1 in the axial direction.

As shown in FIGS. 3 and 4, the inverter unit 8 includes an inverter 80, an inverter case 81 that houses the inverter 80, and a motor connection terminal 70. That is, the motor unit 1 includes the inverter 80 and the inverter case 81.

The inverter case 81 is fixed to the rear side of the housing 6. The inverter case 81 is fixed to the housing 6 by bolt fastening. In the present preferred embodiment, the inverter case 81 is fixed to both the first housing member 61 and the second housing member 62 of the housing 6.

As shown in FIG. 3, the inverter case 81 includes an inverter case main body 82, a first lid body 83a and a second lid body 83b. The inverter case main body 82 has a rectangular or substantially rectangular parallelepiped shape that is long in the axial direction, and has a box or substantially box shape that opens upward.

As shown in FIG. 4, the inverter case main body 82 has a terminal support portion 82a on the right side portion of the front face. In the case of the present preferred embodiment, the terminal support portion 82a is a through hole that penetrates the front side wall of the inverter case main body 82 in the front-rear direction. The motor connection terminal 70 is fixed to the terminal support portion 82a. The motor connection terminal 70 is located in front of the first lid body 83a. The motor connection terminal 70 protrudes forward from the front face of the inverter case main body 82. The motor connection terminal 70 holds three bus bars 84 extending from the inverter 80 in the inverter case 81.

The motor connection terminal 70 is inserted into the first opening hole 61c of the housing 6 shown in FIG. 2. The bus bars 84 supported by the motor connection terminal 70 are electrically connected to the motor 2 inside the housing 6. The motor connection terminal 70 electrically connects the motor 2 and the inverter 80.

The power terminal 9 is connected to the left portion of the front face of the inverter case main body 82. The power terminal 9 is located in front of the second lid body 83b. The power terminal 9 is electrically connected to the inverter 80 via a bus bar (not shown) inside the inverter case main body 82.

The inverter case main body 82 has a plurality of protruding portions each of which is a fixing portion to the housing 6. Specifically, as shown in FIGS. 3 to 5, the inverter case 81 includes a first protruding portion 91, a second protruding portion 92, three third protruding portions 93a, 93b, and 93c, two fourth protruding portions 94a and 94b, and a fifth protruding portion 95.

The first protruding portion 91 is located at the rear end portion of the lower face of the inverter case main body 82. The first protruding portion 91 protrudes downward from the lower end of the inverter case main body 82. The first protruding portion 91 has a through hole 101 that penetrates the first protruding portion 91 in the axial direction.

The second protruding portion 92 is located at the front end portion of the lower face of the inverter case main body 82, as shown in FIGS. 3 and 5. The second protruding portion 92 protrudes downward from the lower end of the inverter case main body 82. The second protruding portion 92 has a through hole 102 that penetrates the second protruding portion 92 in the front-rear direction.

The third protruding portions 93a, 93b, and 93c are located at the front end of the upper end portion of the inverter case main body 82. The third protruding portions 93a, 93b, and 93c are disposed at intervals along the axial direction. The third protruding portions 93a, 93b, and 93c protrude frontward from the upper end of the inverter case main body 82. The third protruding portions 93a, 93b, and 93c have through holes 103a, 103b, and 103c that vertically penetrate the third protruding portions 93a, 93b, and 93c, respectively.

The fourth protruding portions 94a and 94b are located at the front end of the upper end portion of the inverter case main body 82. The fourth protruding portion 94a is disposed adjacent to the left side of the third protruding portion 93a. The fourth protruding portion 94b is disposed adjacent to the right side of the third protruding portion 93c. The fourth protruding portions 94a and 94b protrude obliquely frontward and upward from the upper end of the inverter case main body 82. The fourth protruding portions 94a and 94b have through holes 104a and 104b that penetrate the fourth protruding portions 94a and 94b obliquely frontward and downward from the rear, respectively.

As shown in FIG. 4, the fifth protruding portion 95 is located at the front end on the left side of the lower end portion of the inverter case main body 82. That is, the fifth protruding portion 95 is located below the power terminal 9 connected to the inverter case main body 82. The fifth protruding portion 95 protrudes downward from the lower end of the inverter case main body 82. The fifth protruding portion 95 has two through holes 105 that penetrate the fifth protruding portion 95 in the front-rear direction.

The inverter case 81 is bolted to the first fastening portion 11 to the fifth fastening portion 15 of the housing 6. Specifically, the first protruding portion 91 of the inverter case 81 is disposed at the first fastening portion 11 and is fixed by a first bolt 41. The first bolt 41 passes through the through hole 101 and is tightened in the screw hole 51. The second protruding portion 92 is disposed at the second fastening portion 12 and is fixed by a second bolt 42. The second bolt 42 passes through the through hole 102 and is tightened in the screw hole 52.

The third protruding portions 93a, 93b, and 93c are disposed in the third fastening portions 13a, 13b, and 13c, and are fixed by the third bolts 43a, 43b, and 43c, respectively. The third bolts 43a, 43b, and 43c pass through the through holes 103a, 103b, and 103c and are tightened in the screw holes 53a, 53b and 53c, respectively.

The fourth protruding portions 94a and 94b are disposed at the fourth fastening portions 14a and 14b, and are fixed by the fourth bolts 44a and 44b, respectively. The fourth bolts 44a and 44b are passed through the through holes 104a and 104b and are tightened in the screw holes 53a and 53b, respectively.

The fifth protruding portion 95 is disposed at the fifth fastening portion 15 and is fixed by two fifth bolts (not shown). The two fifth bolts each pass through the through holes 105 and are tightened in the screw holes 55. The fifth protruding portion 95 and the fifth fastening portion 15 are bolted, so that the right portion of the inverter case 81 to which the power terminal 9 is connected is stably supported by the housing 6.

In the motor unit 1 of the preferred embodiment, a plurality of bolts that fasten the housing 6 and the inverter case 81 include the first bolt 41 extending along the left-right direction (first direction), the second bolt 42 extending along the front-rear direction (second direction), the third bolts 43a, 43b, and 43c extending along the vertical direction (third direction) orthogonal to both the axial direction and the front-rear direction, and the fourth bolts 44a and 44b extending in an oblique direction (fourth direction) intersecting all of the left-right direction, the front-rear direction, and the vertical direction.

When the fourth bolts 44a and 44b are not provided, that is, when the housing 6 and the inverter case 81 are fastened simply by the first bolt 41, the second bolt 42 and the third bolts 43a to 43c in three directions orthogonal to each other, the frictional force between the bolt head and the bearing face may be the main fixing force when a force is applied to the inverter case 81 due to vibration during operation.

As an example, in the side view shown in FIG. 6, it is assumed that a force pulling the inverter case 81 away from the housing 6 rearward (−X direction) acts on the motor unit 1. In this case, assuming that the fourth bolts 44a and 44b are not provided, only the second bolt 42 supports the inverter case 81 by the axial force, and the first bolt 41 and the third bolts 43a to 43c support the inverter case 81 by the frictional force between the bolt heads and the bearing faces. For this reason, when a large force is applied to the inverter case 81, the bolt heads of the first bolt 41 and the third bolts 43a to 43c and the bearing faces may slide, and the inverter case 81 may tilt rearward and downward with the second bolt 42 as a fulcrum.

On the other hand, in the present preferred embodiment, the fourth bolts 44a and 44b extending obliquely with respect to the three directions orthogonal to each other are provided. As a result, for example, even when the force that pulls the inverter case 81 backward away from the housing 6 acts on the motor unit 1, the fourth bolts 44a and 44b extend obliquely with respect to the front-rear direction, so that the horizontal component of the axial force of the fourth bolts 44a and 44b acts as a force that fixes the inverter case 81 and the housing 6. Therefore, according to the present preferred embodiment, provided is a motor unit 1 in which the housing 6 and the inverter case 81 are firmly fixed, and an inverter case 81 located at the lateral side of the housing 6 is stably supported.

In the present preferred embodiment, the fourth bolts 44a and 44b are located at the upper end portion of the inverter case 81. The inverter case 81 is fastened to the motor housing unit 6a of the housing 6 by the second bolt 42, the third bolts 43a to 43c, and the fourth bolts 44a and 44b. That is, the inverter case 81 is supported by the housing 6 substantially in the form of a cantilever. For this reason, a force acts on the inverter case 81 by gravity in a direction in which the rear end portion of the inverter case 81 moves downward with the second bolt 42 as a fulcrum. Therefore, a large force is applied to the connecting portion of the upper end portion of the inverter case 81 with the housing 6. Therefore, by disposing the fourth bolts 44a and 44b at the upper end portion of the inverter case 81, it is possible to reinforce the part where a large amount of force is applied, and to support the inverter case 81 more stably by the housing 6.

In the preferred embodiment, the first bolt 41 and the second bolt 42 are located at the lower end portion of the inverter case 81, and the third bolts 43a to 43c are located at the upper end portion of the inverter case 81. According to this configuration, since the bolts with different axial force directions are dispersedly disposed at the upper and lower end portions of the inverter case 81, the entire inverter case 81 can be supported with good balance. Further, since the third bolts 43a to 43c extending in the vertical direction can be tightened from above the inverter case 81, the work is easily performed.

In the present preferred embodiment, the fourth bolts 44a and 44b extend downward toward the front side of the motor unit 1. According to this configuration, since the inverter case 81 is pressed against the housing 6 by tightening the fourth bolts 44a and 44b, the inverter case 81 is firmly fixed. Also, when a force that moves in the direction of rotation about the second bolt 42 is applied to the inverter case 81, the fourth bolts 44a and 44b support the inverter case 81 by their axial force, so that the inverter case 81 can be supported more stably.

In the preferred embodiment, the two fourth bolts 44a and 44b are disposed at the upper end portion of the inverter case 81 with a space in the left-right direction therebetween, and the one second bolt 42 is disposed in the region between the two fourth bolts 44a and 44b at the lower end portion of the inverter case 81. With this configuration, the inverter case 81 can be fixed to the housing 6 by using a small number of bolts more stably.

In the preferred embodiment, the first bolt 41 fastens the inverter case 81 and the overhanging portion 6c of the housing 6, and the second bolt 42, the third bolts 43a to 43c, and the fourth bolts 44a and 44b fasten the front end portion of the inverter case 81 and the motor housing unit 6a of the housing 6. According to this configuration, the first bolt 41 can be tightened to the side face of the overhanging portion 6c that faces the left-right direction, so that a general box-shaped inverter case 81 can be easily fixed. Since a relatively large number of bolts are disposed at the front end portion of the inverter case 81 where the motor connection terminal 70 for electrically connecting the inverter 80 and the motor 2 is provided, the periphery of the motor connection terminal 70 can be firmly fixed.

The first lid body 83a and the second lid body 83b are attached to the upper side of the inverter case main body 82. The first lid body 83a closes the upper opening of the right portion of the inverter case main body 82 where the inverter 80 is housed. The second lid body 83b closes the upper opening of the left portion of the inverter case main body 82 where the bus bars 84 connecting the inverter 80 and the power terminal 9 is housed. In the preferred embodiment, the bus bars 84 and the power terminal 9 can be connected simply by removing the second lid body 83b. As a result, the inverter 80 is not exposed when connecting the terminal, so that it is possible to suppress contact of fingers and the like with the inverter 80, and attachment of dust and the like.

As shown in FIG. 6, the inverter case main body 82 is disposed behind the motor 2 in side view. The inverter case main body 82 and the first axle passage hole 61d overlap at least partially in the vehicle front-rear direction. The first axle passage hole 61d is located below the main body of the inverter case 82. The rear end of the inverter case main body 82 is located rearward of the rear end of the first axle passage hole 61d. The first axle passage hole 61d and the stator 30 vertically (X direction) overlap each other. With such an arrangement, members can be effectively disposed in the space around the drive shaft, and space saving can be achieved in the vehicle.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure.

The invention claimed is:

1. A motor unit comprising:
   a motor having a motor shaft extending along a first direction;
   an inverter that supplies electric power to the motor;
   a housing that supports the motor therein;
   an inverter case that is fixed to one side of the housing in a second direction orthogonal to the first direction and that houses the inverter; and
   a plurality of bolts that fasten the housing and the inverter case,
   wherein
   the plurality of bolts include
      a first bolt extending along the first direction,
      a second bolt extending along the second direction,
      a third bolt extending along a third direction orthogonal to both the first direction and the second direction, and
      one or more fourth bolts extending in a fourth direction intersecting all of the first direction, the second direction and the third direction.

2. The motor unit according to claim 1, wherein the one or more fourth bolts are located at an upper end portion of the inverter case.

3. The motor unit according to claim 2, wherein the first bolt and the second bolt are located at a lower end portion of the inverter case, and the third bolt is located at an upper end portion of the inverter case.

4. The motor unit according to claim 2, wherein the one or more fourth bolts extend downward toward an other side of the second direction.

5. The motor unit according to claim 1, wherein
   two of the fourth bolts are disposed at an upper end portion of the inverter case with a gap in the first direction, and
   the second bolt is disposed in a region between the two fourth bolts at a lower end portion of the inverter case.

6. The motor unit according to claim 1, wherein
   the housing includes
   a motor housing unit that has a tubular shape, that supports the motor therein and that extends in the first direction, and
   an overhanging portion protruding radially outward of the motor shaft from the motor housing unit,
   the inverter case overlaps at least part of the overhanging portion when viewed in the first direction,
   the first bolt fastens the inverter case and the overhanging portion, and
   the second bolt, the third bolt, and the one or more fourth bolts fasten an end portion of the inverter case on an other side of the second direction, and the motor housing unit.

7. The motor unit according to claim 1, wherein
   the inverter case is disposed behind the motor in the second direction,
   the housing has an axle passage hole through which a drive shaft passes,
   when viewed in the first direction,
   the axle passage hole overlaps the inverter case at least partially in the first direction, and
   the axle passage hole is located below the inverter case.

8. The motor unit according to claim 7, wherein
   a rear end of the inverter case is located rearward of a rear end of the axle passage hole.

9. The motor unit according to claim 7, wherein
   the motor includes
   a rotor that rotates around a motor shaft, and
   a stator located radially outside of the rotor, and
   the axle passage hole and the stator overlap each other in the second direction.

* * * * *